United States Patent [19]

Letteney et al.

[11] 4,228,520
[45] Oct. 14, 1980

[54] HIGH SPEED MULTIPLIER USING CARRY-SAVE/PROPAGATE PIPELINE WITH SPARSE CARRIES

[75] Inventors: Robert C. Letteney; Samuel R. Levine; David T. Shen; Arnold Weinberger, all of Poughkeepsie, N.Y.

[73] Assignee: International Business Machines Corporation, Armonk, N.Y.

[21] Appl. No.: 36,198

[22] Filed: May 4, 1979

[51] Int. Cl.³ .......................... G06F 7/52; G06F 7/50
[52] U.S. Cl. ...................................... 364/760; 364/786
[58] Field of Search ................................. 364/760, 786

[56] References Cited

U.S. PATENT DOCUMENTS

| | | | |
|---|---|---|---|
| 3,515,344 | 6/1970 | Goldschmidt et al. | 364/786 |
| 3,691,359 | 9/1972 | Dell et al. | 364/760 X |
| 3,840,727 | 10/1974 | Amdahl et al. | 364/760 |
| 4,041,292 | 8/1977 | Kindell | 364/760 |

OTHER PUBLICATIONS

Larson "High-Speed Multiply Using Four Input Carry-Save Adder", *IBM Tech. Disclosure Bulletin*, vol. 16, No. 7, Dec. 1973, pp. 2053-2054.

*Primary Examiner*—David H. Malzahn
*Attorney, Agent, or Firm*—Robert W. Berray

[57] ABSTRACT

A high speed multiply apparatus minimizes latch requirements and I/O pin requirement between chips by a new configuration which iteratively adds four multiples of a multiplicand in a stage of 4-2 carry save adders which then feed four-bit parallel adders each having four sum outputs and a carry output from the highest order bit position. Only the sum outputs are latched and then fed to a carry propagate adder on each iteration for addition to the previous partial products. Only the single carry output from each of the 4-bit parallel adders needs to be latched and then fed to another 4-bit parallel adder.

7 Claims, 8 Drawing Figures

HIGH SPEED MULTIPLIER USING CARRY-SAVE/PROPAGATE PIPELINE WITH SPARSE CARRIES

BACKGROUND OF THE INVENTION

1. Field of the Invention

The present invention relates to improvements in high speed multiply apparatus which minimizes latch requirements and I/O pin requirements between chips while attaining substantially the same operation speed as that of a conventional high speed multiply apparatus using a carry-save adder tree and a carry propagate adder.

2. Description of the Prior Art

U.S. Pat. No. 3,515,344 provides a high speed multiplier using a carry-save adder tree. A plurality of carry save adder stages, each comprised of one or more carry save adder units are arranged in a configuration which permits the summation of a plurality of plural-binary bit operands. Successive pluralities of operands are applied to the adder prior to the generation of a final sum for the plurality of operands previously applied.

"The IBM System/370 Model 91: Floating-Point Execution Unit" by S. F. Anderson et al, IBM Journal of Research and Development, January 1967, pp. 34–53, also provides the same high speed multiplier as that disclosed in the above-mentioned U.S. Pat. No. 3,515,344.

"4-2 Carry-Save Adder Implementation Using Send Circuits" by D. T. Shen et al, IBM TDB Vol. 20, No. 9, February 1978, pp. 3594–3597, shows a 4-2 carry-save adder.

"Multiplier Decoding With Look-Ahead" by A. Weinberger, IBM TDB Vol. 20, No. 9, February 1978, pp. 3591–3593 shows how to reduce the number of multiplier decoder outputs, gating in the selection of multiplicand multiples, and loading on multiplicand bits without reducing performance.

"A Comparison of Two Approaches to Multi-Operand Binary Addition" by D. E. Atkins et al, Proceedings 4th Symposium on Computer Arithmetic, Oct. 25-27, 1978, IEEE Catalog No. 78 CH 1412-6C, Library of Congress No. 78-70857, pp. 125–139, shows methods for addition of $P > 2$ numbers, each encoded as a vector of digits (digit vector) of length N. It shows a carry-lookahead adder tree and a carry-save adder tree.

"High-Speed Multiplication and Multiple Summand Addition" by R. S. Lim, Proceedings 4th Symposium on Computer Arithmetic, Oct. 25-27, 1978, IEEE Catalog No. 78 CH 1412-6C, Library of Congress No. 78-70857, pp. 149–153, discusses the problem of high-speed multiplication from the viewpoint of summand generation and summand summation.

Multiplication of large binary numbers in digital data processing machines is a time consuming operation. The computers usually execute the multiply operation by repetitive addition, and the time required is dependent on the number of additions required. Many structures have been provided for the multiply operation. Present systems usually provide a multiplication system wherein a plurality of multiplier binary bits are examined simultaneously to thereby cause multiples of a multiplicand to be added to a previously generated partial product. One such form of this type of multiply structure for binary numbers is shown in U.S. Pat. No. 3,515,344 entitled "Apparatus for Accumulating the Sum of a Plurality of Operands" by R. E. Goldschmidt et al, filed Aug. 31, 1966 and issued June 2, 1970, said patent being assigned to the assignee of the present application.

In this prior multiply apparatus, a plurality of carry save adder stages, each comprised of one or more carry save adder units are arranged in a configuration which permits the summation of a plurality of plural-binary bit operands. A first plurality of carry save adder stages is arranged to reduce six operands to a first output signal representing the sum and a second output signal representing carries. A second plurality of carry save adder stages are arranged in loop fashion such that the carry and sum output of the second plurality of stages are combined with the carry and sum outputs from the first plurality of stages at the input to the second plurality of stages. Certain of the carry save adder stages are comprised of latching means to retain the data for a specified period of time. Signal delays through the second plurality of stages and the time between timing pulse inputs to the other latch stages are equal such that the outputs from the second plurality of stages representing the sum of the first plurality of operands will combine with the outputs of the first plurality of stages representing the sum of a second plurality of operands. The timing pulses, circuit delays, and latched stages permit the application of operands to the input of the adder arrangement at a rate equal to that of the delay through only the second plurality of carry save adder stages.

There was difficulty in fitting the high speed multiply apparatus as shown in the above-mentioned U.S. Pat. No. 3,515,344 in the circuit module for the CPU because such as previous multiply apparatus required all carry and sum outputs of the carry-save adder tree on one chip to be wrapped around to the input of the carry-save adder tree on another chip. Also, latch circuits were required for the carry outputs of the carry-save adder tree.

SUMMARY OF THE INVENTION

It is, therefore, an object of the present invention to provide a high speed multiply apparatus which minimizes latch requirements and I/O pin requirements between chips.

It is another object of the present invention to provide a high speed multiply apparatus in which only a single carry output of an n-bit parallel adder needs to be fed to another chip.

It is a further object of the present invention to provide a high speed multiply apparatus which uses a new configuration of a 4-2 carry-save adder tree.

In accordance with one preferred embodiment of the present invention, the above objects are accomplished by a new configuration which iteratively adds four multiples of a multiplicand in a 4-2 carry-save adder tree which then feeds a 4-bit parallel adder having four sum outputs, and a single carry output from the high order position. Only the sum outputs are latched and then fed to the carry propagate adder on each iteration for addition to the previous partial product. I/O pin assignments for chips is reduced in that only the single carry output of the 4-bit parallel adder needs to be fed to another chip.

DESCRIPTION OF THE PREFERRED EMBODIMENTS

The present invention finds use in a floating point and/or fixed point arithmetic unit of a data processing system where it is desired to multiply floating point and/or fixed point binary numbers. The floating point numbers to be multiplied typically consist of 64 binary bits. The highest order or bit 0 position of the floating point number represents the sign of the number. Positions 1–7 represent an exponent value to the base 16 (hexadecimal) and position 8 through 63 represent a fraction portion of the number. The fraction is comprised of 14 hexadecimal digits, each digit comprised of 4 binary bits. The radix point of the number represented is assumed to be between positions 7 and 8 in the binary number. As is well known in floating point multiply only the fraction portion of the numbers are multiplied while the exponent values are added to achieve a final exponent value. In a preferred embodiment of the present invention, two floating-point binary numbers each comprised of 56 binary bits representing the fraction portion of the number are multiplied together. An optional multiplier used for short floating point operations considers only bits 40–63 of the multiplier and bits 8–31 of the multiplicand valid, and the remaining bits zeros.

For fixed point multiply operations, the preferred embodiment provides half-word and full-word options. The half-word option includes a multiplicand in bit positions 16–47 of which bit 16 is the sign bit and bits 17–47 data bits, and a multiplier in bit positions 48–63 of which bit 48 is the sign bit and 49–63 data bits. The full-word option includes a multiplicand in bit positions 0–31 of which bit 0 is the sign bit and 1–31 data bits, and a multiplier in bit positions 32–63 of which 32 is the sign bit and 33–63 data bits. Fixed point number, when negative, is typically represented in two's complement form.

The preferred options for multiplication operands are summarized below:

|  |  | Multiplicand | | | | |
|---|---|---|---|---|---|---|
|  |  | 0 1 ... 8 | ... 16 17 | ... 31 | ... 47 | ... 63 |
| Floating Point Options | Long or Extended | D | | | | D |
|  | Short | | D | ... D | | |
| Fixed Point Options | Half-word | | | S D | ... D | |
|  | Full-word | S D | | ... D | | |

|  |  | Multiplier | | | |
|---|---|---|---|---|---|
|  |  | 8 ... 32 33 | ... 40 | ... 48 49 | ... 63 |
| Floating Point Options | Long or Extended | D | | | D |
|  | Short | | | D | ... D |
| Fixed Point Options | Half-word | | | | S D ... D |
|  | Full-word | | S D | | ... D |

The preferred alignments of the multiplicand and multiplier reduce the need for aligning the final product.

Figure 1:
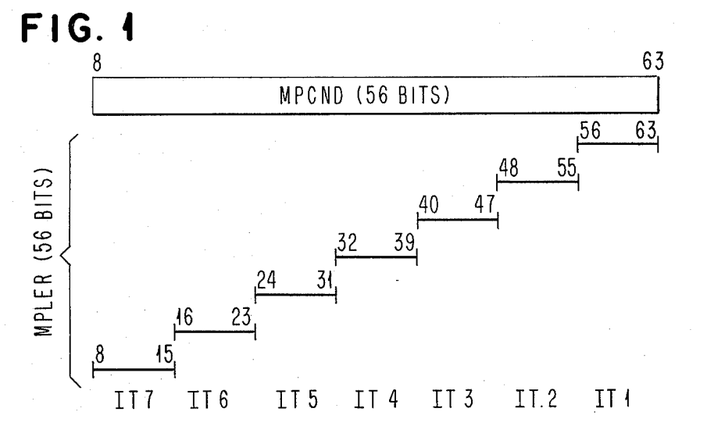
FIG. 1 schematically shows multiplication operation in which a plurality of multiplier bits are examined simultaneously to cause multiples of a multiplicand to be added to a previously generated partial product.

FIG. 1 shows diagramatically a manner in which a partial product is generated in each iteration by simultaneously examining a plurality of multiplier binary bits. In a specific example shown in FIG. 1, a 56-bit multiplicand and a 56-bit multiplier are multiplied together, and the 56-bit multiplier is divided into seven 8-bit multiplier groups; bits 56–63, bits 48–55, bits 40–47, bits 32–39, bits 24–31, bits 16–23 and bits 8–15. In a first iteration period or iteration 1, the 56-bit multiplicand is multiplied by the first 8-bit multiplier group (bits 56–63) to produce a partial product P1. In the next iteration period or iteration 2, the 56-bit multiplicand is multiplied by the second 8-bit multiplier group (bits 48–55) to produce a partial product P2. Similarly, the 56-bit multiplicand is multiplied by the third through seventh 8-bit multiplier groups in iterations 3 through 7, respectively. In order to save the time required to add all of the partial products P1 through P7 together to produce a final product, in the above-mentioned U.S. Pat. No. 3,515,344 as well as in the preferred embodiment of the present invention, the partial product P1 generated in the iteration 1 is right-shifted by eight positions and added to the partial product P2 in the iteration 2 to produce an interim sum $P2+P1\times 2^{-8}$. In the same manner, in each of the iterations 3, 4, 5, 6 and 7, the interim sum generated in the previous iteration periods is right-shifted by eight positions and added to the newly generated partial product in each iteration. Table 1 shows a manner in which interim sums are generated in the respective iterations. As seen from Table 1, at the end of the iteration 7, the sum generated is equal to $$P7+P6\times 2^{-8}+P5\times 2^{-16}+P4\times 2^{-24}+P3\times 2^{-32}+P2\times 2^{-40}+P1\times 2^{-48}$$

which represents the final product.

TABLE 1

| ITER-ATION | MPCND BITS | MPLER BITS | PARTIAL PRODUCT/ INTERIM SUM |
|---|---|---|---|
| 1 | 8–63 | 56–63 | P1 |
| 2 | 8–63 | 48–55 | $P2+P1\times 2^{-8}$ |
| 3 | 8–63 | 40–47 | $P3+P2\times 2^{-8}+P1\times 2^{-16}$ |
| 4 | 8–63 | 32–39 | $P4+P3\times 2^{-8}+P2\times 2^{-16}+P1\times 2^{-24}$ |
| 5 | 8–63 | 24–31 | $P5+P4\times 2^{-8}+P3\times 2^{-16}+P2\times 2^{-24}+P1\times 2^{-32}$ |
| 6 | 8–63 | 16–23 | $P6+P5\times 2^{-8}+P4\times 2^{-16}+P3\times 2^{-24}+P2\times 2^{-32}+P1\times 2^{-40}$ |
| 7 | 8–63 | 8–15 | $P7+P6\times 2^{-8}+P5\times 2^{-16}+P4\times 2^{-24}+P3\times 2^{-32}+P2\times 2^{-40}+P1\times 2^{-48}$ |

Figure 2:
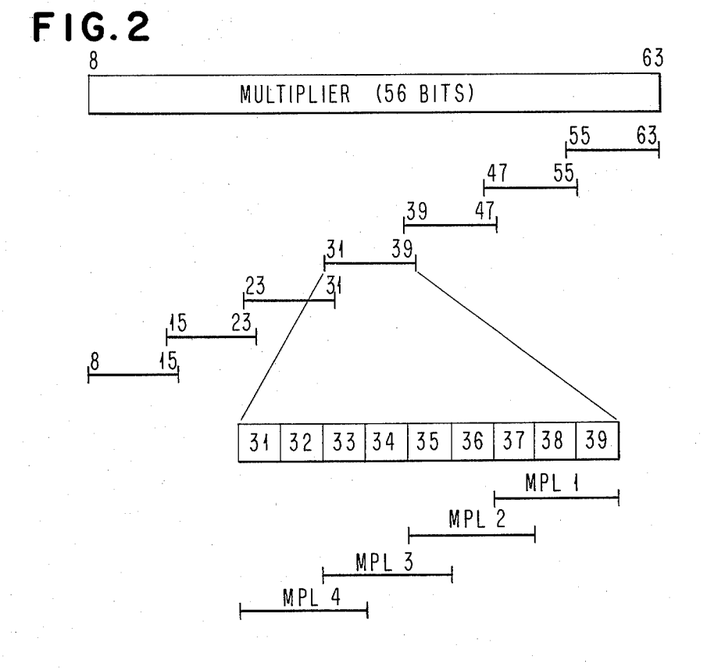
FIG. 2 schematically shows how the plurality of multiplier bits are examined in each iteration.

In the preferred embodiment of the present invention, each multiplier group is further decoded in accordance with a multiplier recording algorithm as shown in FIG. 2. As shown therein, nine bits, instead of eight bits, of the multiplier for each iteration are decoded, with an overlap of one bit between iterations. Each 9-bit multiplier group is further divided into four 3-bit sub-groups, with an overlap of one bit between sub-groups. In FIG. 2 which shows the four 3-bit multiplier sub-groups for only the iteration 4, the bits 31-39 are divided into four 3-bit multiplier sub-groups MPL1 (bits 37-39), MPL2 (bits 35-37), MPL3 (bits 33-35) and MPL4 (bits 31-33). Those multiplier sub-groups are decoded to generate multiples of the multiplicand, which are added to or subtracted from the partial product. The multiples of the multiplicand are generated by shifting the position of the multiplicand in its true form or complement form. Thus, the recoding algorithm determines how much the multiplicand is to be shifted and whether it is to be gated in its true or complement form. A particular multiplier recoding algorithm used in the preferred embodiment of the present invention is disclosed in an article "Multiplier Decoding with Look-Ahead" by A. Weinberger, IBM TDB, Vol. 20, No. 9, February 1978, pp. 3591-3593. Table 2 shows how each multiple is decoded. Assume that a 9-bit multiplier group [R128, R64, R32, R16, R8, R4, R2, R1, R ½] is being examined in a certain iteration. Subscripts refer to relative weights of the bit positions. The bit R ½ is a high-order bit of the next lower 9-bit group and the bit R128 is a low-order bit of the next higher 9-bit group. Now, considering the three multiplier bits [R2, R1, R ½] and assuming that the bits at and lower than the bit position R ½ are all zero, if the multiplier bits [R2, R1] are [0, 0] representing X0 operation, they are decoded as "0". If [R2, R1] are [0, 1] representing X1 operation, they are decoded as "+1". If [R2, R1] are [2, 0] representing X2 operation, they are decoded as [Rem 4, −2] (Rem 4 stands for Remember 4). This means that the operation of (multiplicand) X4-(multiplicand)X2 is performed instead of the operation of (multiplicand)X2. Since the X2 and X4 operations are equivalent to shifting the multiplicands to the left by one and two bit positions, respectively, relative to X1, the operation of (multiplicand)X4-(multiplicand)X2 is equivalent to left-shifting relative to X1 the multiplicand two positions in true form, left-shifting relative to X1 the multiplicand one position in complement form, and adding the two shifted multiplicands. Now, since the X4 operation, i.e., left-shifting relative to X1, the multiplicand two positions is equivalent to the R4="4" in the next higher multiplier sub-group [R8, R4, R2], the X4 operation is not carried out for the sub-group [R2, R1, R ½] but the "Rem 4" bit is generated so that the X4 operation is carried out in the operation for the next higher sub-group [R8, R4, R2]. The Table 2 shows how the remembered bits are generated by four decoders arranged in series. The low-order decoder treats its lowest bit as the remembered input. Each succeeding decoder determines the remembered input as a function of the input to the lower-order decoders. For example, the remembered bits are generated in accordance with the following logical expressions.

Rem4 = R2 + R1·R ½

Rem16 = R8 + R4·R2 + R4·R1·R ½

Rem64 = R32 + R16]R8 + R16·R4·R2 + R16·R4·R1·R ½

As a result, the decoders need to generate only three selection signals each (+1, −1, −2; +4, −4, −8; +16, −16, −32) except the high-order decoder which generates four selection signals (+64, −64, +128, −128) using the high-order bit as the remembered output.

Of course, the multiplier decode concept can be generalized to decoding other than 9 bits at a time.

Figure 3:
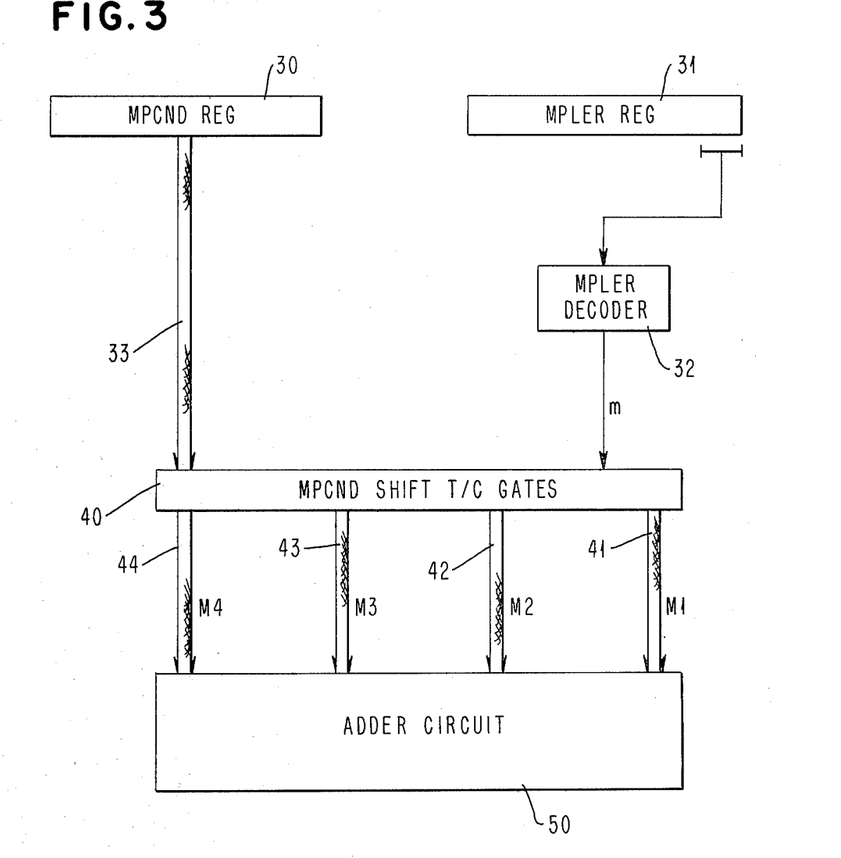
FIG. 3 shows in block diagram form an arrangement of a high speed multiplier apparatus which permits the summation of a plurality of plural-bit operands.

An additional multiplicand multiple is generated when the low-order bit of the low-order 9-bit multiplier group is 1. This bit is presumed to be shared between the low-order group and a next-lower-order group consisting of the shared bit followed by eight lower-order zeros. If this next-lower-order group were decoded during iteration φ (i.e., during the iteration that would precede the first iteration of Table 1), it would produce a multiple of −128 requiring the selection of the complement of the multiplicand right-shifted φ positions, according to Tables 2 and 3. The preferred method of handling this additional multiplier decoding and multiplicand selection is not shown but works as follows: during iteration φ the low-order bit (bit 63) of the multiplier in multiplier register 31 is detected and latched up in the multiplier decoder 32. During iteration 1 the latched bit selects the above additional multiplicand multiple and inserts it into the now-empty carry propagate adder of adder circuit 50.

TABLE 2

TABLE 2-continued

| | | | | DE- | 0 | 0 | 0 | 0 | 0 |
|---|---|---|---|---|---|---|---|---|---|
| | | | | CO- | 0 | 4 | 0 | 0 | +1 |
| | | | | DER | 8 | 0 | 0 | Rem16 | −8 |
| | | | | 2 | 8 | 4 | 0 | Rem16 | −4 |
| | | | | | 0 | 0 | Rem4 | 0 | +4 |
| | | | | | 0 | 4 | Rem4 | Rem16 | −8 |
| | | | | | 8 | 0 | Rem4 | Rem16 | −4 |
| | | | | | 8 | 4 | Rem4 | Rem16 | 0 |

↓ ↓ ↓ ↓ ↓   m3

| | | DE- | 0 | 0 | 0 | 0 | 0 |
|---|---|---|---|---|---|---|---|
| | | CO- | 0 | 16 | 0 | 0 | +1 |
| | | DER | 32 | 0 | 0 | Rem64 | −32 |
| | | 3 | 32 | 16 | 0 | Rem64 | −16 |
| | | | 0 | 0 | Rem16 | 0 | +16 |
| | | | 0 | 16 | Rem16 | Rem64 | −32 |
| | | | 32 | 0 | Rem16 | Rem64 | −16 |
| | | | 32 | 16 | Rem16 | Rem16 | 0 |

↓ ↓ ↓   m4

| DE- | 0 | 0 | 0 | 0 | 0 |
|---|---|---|---|---|---|
| CO- | 0 | 64 | 0 | 0 | +64 |
| DER | 128 | 0 | 0 | Rem256 | −128 |
| 4 | 128 | 64 | 0 | Rem256 | −64 |
| | 0 | 0 | Rem 64 | 0 | +64 |
| | 0 | 64 | Rem 64 | 0 | +128 |
| | 128 | 0 | Rem 64 | Rem256 | −64 |
| | 128 | 64 | Rem 64 | Rem256 | 0 |

Low-order bit of next 9-bit group  →Rem256 = R128

Table 3 shows how much each of the decoded outputs ml through m4 in Table 2 causes the multiplicand to be shifted. For example, when ml = +1, this means that the multiplicand is to be right-shifted seven positions and gated into an adder tree, which will be described later, in its true form. As was discussed hereinabove in conjunction with Table 1, each of the partial products P1, P2, P3 . . . must be right-shifted by eight positions before they are added to the newly generated partial product in the next iteration. Accordingly, in the preferred embodiment of the present invention, m (=ml, m2, m3 or m4) = +1 is decoded as right shift 7 (RS 7) which is equivalent to left shift 1 plus right shift 8. Similarly, m=1 is decoded as RS 7 in complement form, m= −2 is decoded as RS 6 (=LS 2 plus RS 8) in complement form. The m= +128 is decoded as RS 0 (=LS 8 plus RS 8) in true form.

Referring to FIG. 3, there is shown in block diagram form the essential functional units of a multiplier apparatus which employs the multiplier recoding algorithm shown in FIG. 2 and Tables 2 and 3. The multiplier apparatus of FIG. 3 comprises a multiplicand register 30 and a multiplier register 31. The seven 9-bits multiplier groups are gated from the multiplier register 31 to a multiplier decoder 32, one group for each iteration, where the given 9-bit multiplier group is decoded in accordance with the truth table shown in Tables 2 and 3 to produce decode outputs m1, m2, m3 and m4 for each iteration. In the preferred embodiment the multiplier register 31 is shifted 8 bit positions to the right each succeeding iteration, so that the correct 9 bits emanate from the register via the same 9 signal lines into the multiple decoder 32. The multiplicand in the multiplicand register 30 is gated through a bus 33 to a multiplicand shift T/C gates 40 where the multiplicand is right-shifted by the number of positions shown in the truth table of Table 3 in either true or complement form, as is also shown in Table 3, to produce four multiples M1, M2, M3 and M4 of the multiplicand. Those multiplicand multiples M1, M2, M3 and M4 from the gates 40 are then gated through buses 41, 42, 43, 44 to an adder circuit 50 comprising a carry-save adder tree and a propagation adder, which carries out the summation operation of the multiplicand multiples M1 through M4 to produce the partial products P1, P2 . . . P7 as illustrated in Table 1 and also the summation operations of those partial products to produce the final products, in the manner illustrated in Table 1.

TABLE 3

| M1 M4 | Right Shift | T/C |
|---|---|---|
| +1 | RS7 | True |
| −1 | RS7 | Complement |
| −2 | RS6 | Complement |
| +4 | RS5 | True |
| −4 | RS5 | Complement |
| −8 | RS4 | Complement |
| +16 | RS3 | True |
| −16 | RS3 | Complement |
| −32 | RS2 | Complement |
| +64 | RS1 | True |
| −64 | RS1 | Complement |
| +128 | RS0 | True |
| −128 | RS0 | Complement |

Figure 4:
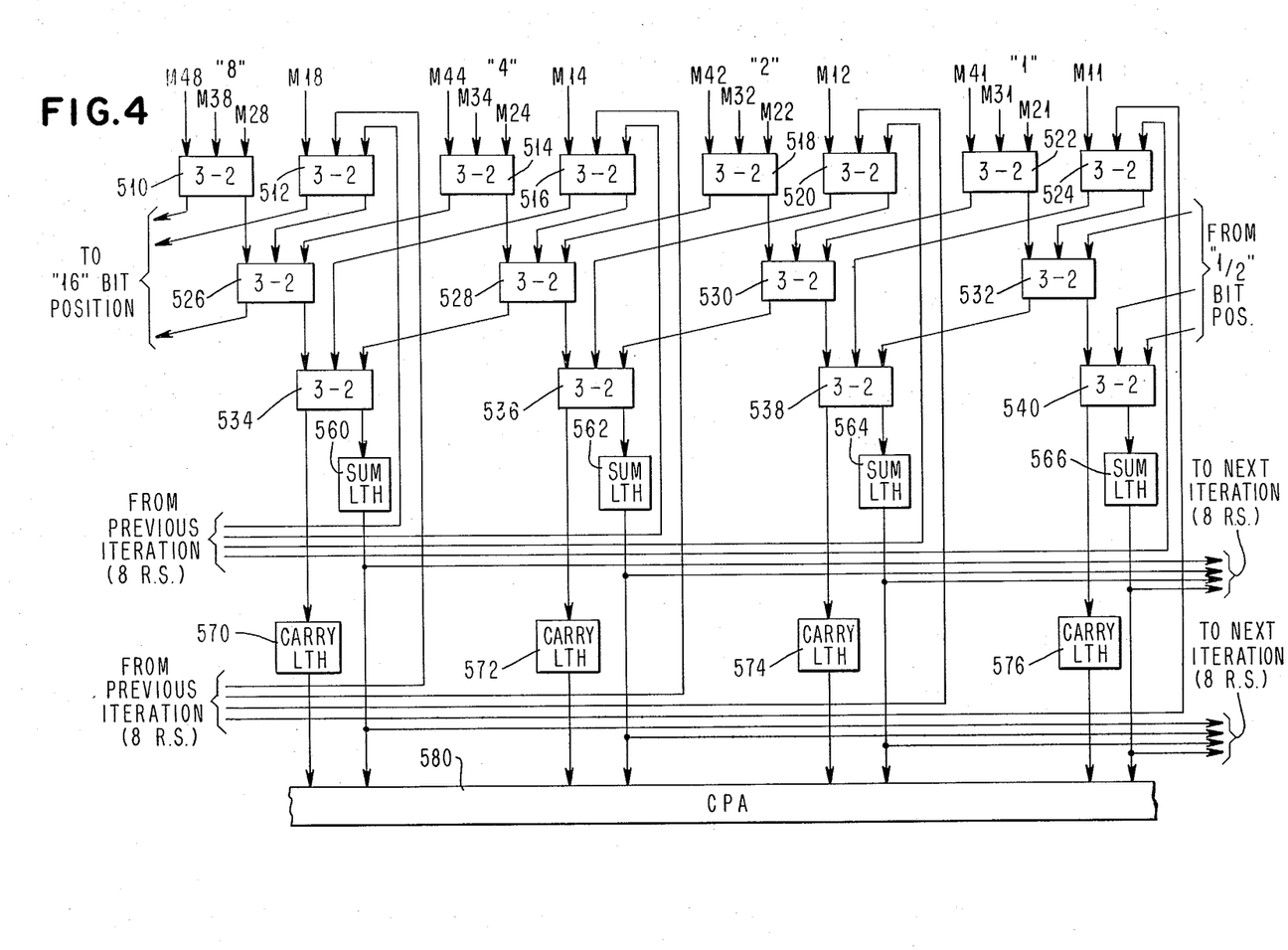
FIG. 4 shows in block diagram form a 4-bit slice of an adder circuit in FIG. 3, which is constructed in accordance with the teaching of U.S. Pat. No. 3,515,344.

FIG. 4 shows a 4-bit slice of the adder circut 50 shown in FIG. 3, which is implemented using a conventional technique. The adder circuit shown in FIG. 4 comprises a carry-save adder tree comprising a plurality of 3-2 carry-save adders 510 through 540, a group of sum latches 560 through 566, a group of carry latches 570 through 576 and a carry propagate adder 580. While only four bit positions "1", "2", "4" and "8" art shown in FIG. 4, it will be clear to those skilled in the art that any desired number of bit positions may be additionally provided and they may be interconnected in the similar manner. M11, M12, M14 and M18 represent "1", "2", "4" and "8" weighted bits, respectively of the multiplicand multiple M1 derived from the multiplicand shift T/C gates 40 shown in FIG. 3. Similarly, M21, M22, M24 and M28 represent "1", "2", "4" and "8" weighted bits of the multiplicand multiple M2, and M31, M32, M34 and M38 are those for the multiplicand multiple M4, and M41, M42, M44 and M48 are those for the multiplicand multiple M8. In FIG. 4, the adder tree has six inputs for each bit position. An adder tree portion for the bit position "1" comprises two first stage 3-2 CSA's (carry-save adders) 522 and 524, a second stage CSA 532, a third stage 3-2 CSA 540, a sum latch 566 and a carry latch 576. The logic of a 3-2 carry-save adder order is to receive the binary 1 or binary 0 inputs from three different operands and produce two signals at its output, one representing the sum of the binary 1's applied and the other representing a carry produced by the three inputs. A binary 1 or significant output signal representing a sum will be produced when a combination of binary 1 inputs is equal to 1 or 3, and a carry signal will be produced when 2 or 3 binary 1 inputs are present.

Similarly, a "2" bit position adder tree portion comprises a pair of first stage 3-2 CSA's 518 and 520, a second stage 3-2 CSA 530, a third stage 3-2 CSA 538, a sum latch 564 and a carry latch 574. A "4" bit position adder tree portion comprises a pair of first stage 3-2 CSA's 514 and 516, a second stage 3-2 CSA 528, a third stage 3-2 CSA 536, a sum latch 562 and a carry latch 572. A "8" bit position adder tree portion comprises a pair of first stage 3-2 CSA's 510 and 512, a second stage 3-2 CSA 526, a third stage 3-2 CSA 534, a sum latch 560 and a carry latch 570. Latched sums from the sum latches 560, 562, 564 and 566 and latched carries from the carry latches 570, 572, 574 and 576 are applied to the carry propagate adder 580 where a final sum or final product of the input operands is produced.

In the bit position "1", four of the six inputs to the first stage CSA's 522 and 524 receive the "1" weighted bits M11, M21, M31 and M41 of the four multiplicand multiplies M1 through M4 and two other inputs receive a sum and a carry from the previous iteration. A sum from the CSA 522, a sum from the CSA 524 and a carry from a "½" bit position are added together in the second stage CSA 532 while a carry from the CSA 522 and a carry from the CSA 524 are applied to the "2" weighted CSA's 530 and 538, respectively. A sum from the second stage CSA 532 is applied to the third stage CSA 540 where it is added together with two carries from the "½" bit position while a carry from the CSA 532 is applied to the "2" weighted CSA 538. A sum from the third stage CSA 540 is applied to the sum latch 566 while a carry from the CSA 540 is applied to the carry latch 576. Similar operations are performed by the adder tree portions for the "2", "4" and "8" bit positions. The sums latched in the sum latches 560, 562, 564 and 566 and the carries latched in the carry latches 570, 572, 574 and 576 are properly shifted and fed back to appropriate bit positions in the next iteration. The sums in the sum latches 560, 562, 564 and 566 and the carries in the carry latches 570, 572, 574 and 576 are added together in the carry propagate adder 580 to generate a final product of the multiplication. The logic and the algorithm carried out in the adder circuit of FIG. 4, are essentially the same as that shown and explained in the above-mentioned U.S. Pat. No. 3,515,344 and hence no further detail will be explained herein.

While the arrangement of the adder circuit of FIG. 4 attains a fast addition or multiplication operation by permitting the summation of a plurality of plural-bit operands, it requires a large number of latches as well as a large number of I/O pins between chips assuming that the arrangement of the adder circuit is constructed by a plurality of chips each covering multiple bit positions, which is considered most practical in the present day technology of packaging.

Such latch requirements and I/O pin requirements are minimized by an arrangement of the adder circuit in accordance with the present invention, which will be explained in detail with reference to FIG. 5.

Figure 5:
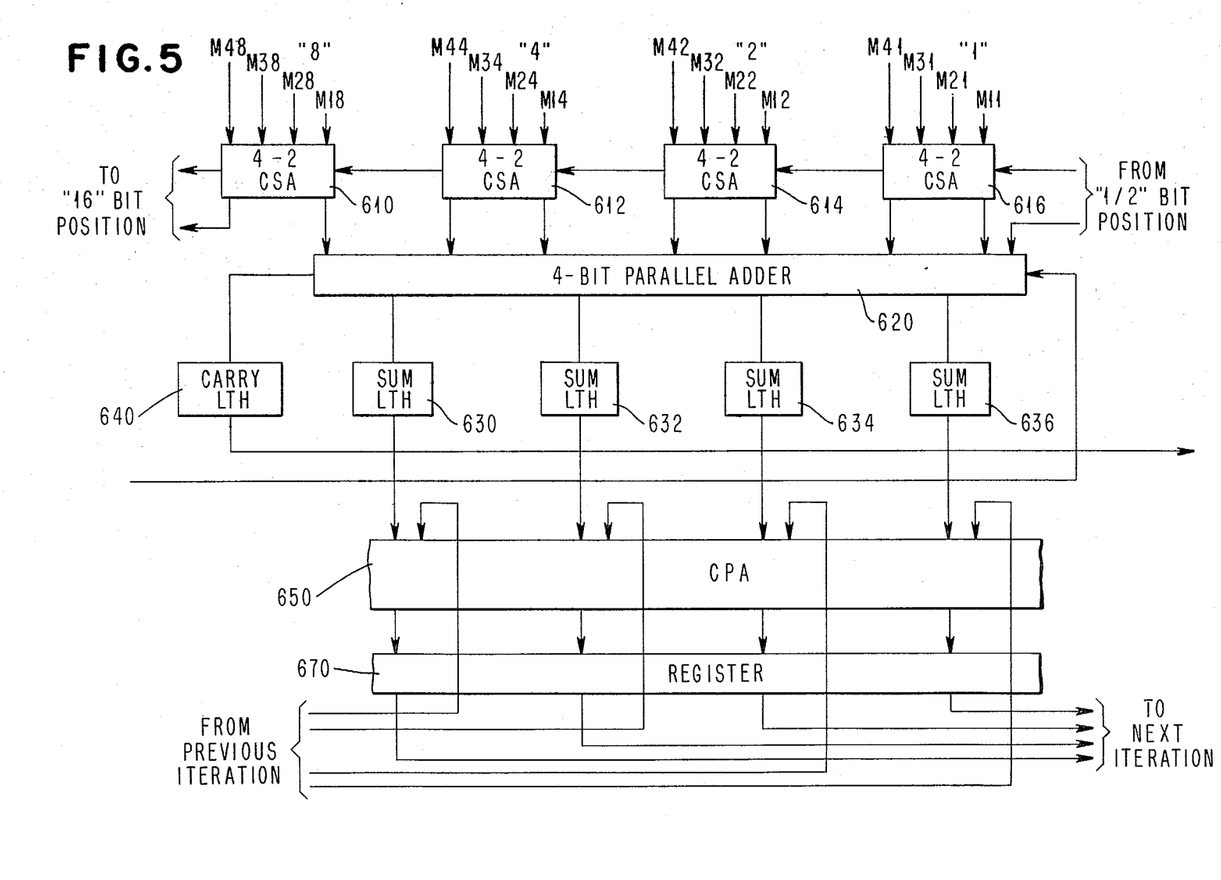
FIG. 5 shows in block diagram form a 4-bit slice of the adder circuit of FIG. 4, which is constructed in accordance with a principle of the present invention.

FIG. 5 shows a 4-bit slice of the adder circuit 50 of FIG. 3 constructed in accordance with a preferred embodiment of the present invention. It uses one 4-2 carry-save adder (CSA) for each bit position and one n-bit adder (4-bit adder in the illustrated embodiment) for each n bit positions. More particularly, it comprises 4-2 CSA's 610, 612, 614, 616, . . . , one for each bit position, 4-bit parallel adders 620, one for every 4 bit positions (more generally, n-bit adders one for every n bit positions), sum latches 630, 632, 634, 636, . . . , one for each bit position, carry latches 640, . . . , one for each 4-bit (or n-bit) parallel adder 620, . . . , a carry propagation adder 650, and a register 670.

Figure 6:
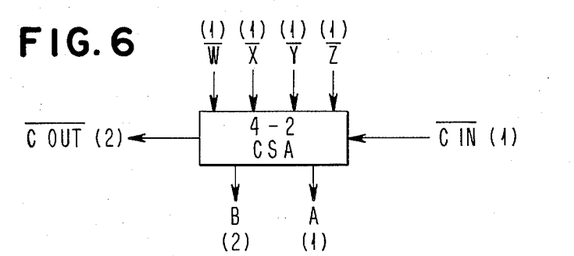
FIG. 6 shows a logical block diagram of a 4-2 carry-save adder used in the preferred embodiment of the present invention.
Figure 7:
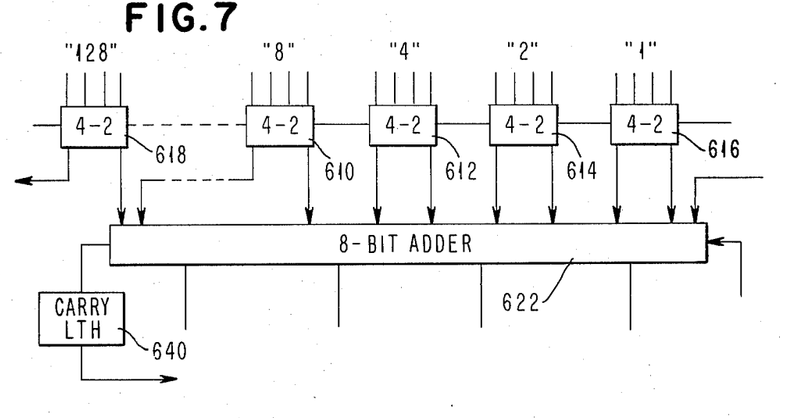
FIG. 7 shows in block diagram form a modification of the embodiment shown in FIG. 5.

A 4-2 CSA is shown and described in the article "4-2 Carry-Save Adder Implementation Using Send Circuits" by D. T. Shen and A. Weinberger, IBM TDB, Vol. 20, No. 9, February 1978, pp. 3594–3597, and it is briefly explained here with reference to FIG. 6 since it does not form any part of the present invention. The 4-2 CSA receives four input operands and a lateral carry-in from the next lower-order adder and generates two outputs and a lateral carry-out to the next higher-order adder. The lateral carry-out is a function of only the four input operands while the other two outputs are functions of all 5 inputs to the CSA. FIG. 7 shows a logic block diagram of the 4-2 CSA's in which numerals in parentheses indicate weights of bits, and Table 4 shows logic performed by the 4-2 CSA of FIG. 7.

TABLE 4

|    |   |   |   |   |   |   |   |   |   |                                                           |
|----|---|---|---|---|---|---|---|---|---|-----------------------------------------------------------|
|    |   | 0 | 0 | 0 | 0 | 1 | 1 | 1 | 1 | Cin                                                       |
|    |   | 0 | 0 | 1 | 1 | 0 | 0 | 1 | 1 | Y                                                         |
| WX |   | 0 | 1 | 0 | 1 | 0 | 1 | 0 | 1 | Z                                                         |
| 00 |   | 0 | 1 | 1 | 2 | 1 | 2 | 2 | 3 |                                                           |
| 01 |   | 1 | 2 | 2 | 3 | 2 | 3 | 3 | 4 | No. of                                                    |
| 10 |   | 1 | 2 | 2 | 3 | 2 | 3 | 3 | 4 | 'On'                                                      |
| 11 |   | 2 | 3 | 3 | 4 | 3 | 4 | 4 | 5 | Inputs                                                    |
| 00 |   |   |   | 2 |   |   |   | 2 |   |                                                           |
| 01 |   |   |   | 2 |   |   |   | 2 |   | $Cout = W \cdot X + Y \cdot Z$                            |
| 10 |   |   |   | 2 |   |   |   | 2 |   |                                                           |
| 11 |   | 2 | 2 | 2 | 2 | 2 | 2 | 2 | 2 | $\overline{Cout} = (\overline{W} + \overline{X}) \cdot (\overline{Y} + \overline{Z})$ |

TABLE 4-continued

| | | | | | | | |
|---|---|---|---|---|---|---|---|
| 00 | | | | | 2 | 2 | $\overline{B} = (\overline{W} + \overline{X}) \cdot (\overline{Y \vee Z}) \cdot \overline{C_{in}}$ |
| 01 | 2 | 2 | | 2 | 2 | 2 | 2 | $+ (\overline{W \vee X}) \cdot (\overline{Y} + \overline{Z}) \cdot \overline{C_{in}}$ |
| 10 | 2 | 2 | | 2 | 2 | 2 | 2 | $+ (\overline{W \vee X}) \cdot (\overline{Y \vee Z}) \cdot (\overline{W} + \overline{X})$ |
| 11 | | | 2 | 2 | 2 | 2 | $+ (\overline{W \vee X}) \cdot (\overline{Y \vee Z}) \cdot (\overline{Y} + \overline{Z})$ |
| 00 | | 1 | 1 | 1 | | | 1 | $\overline{A} = (\overline{W \vee X}) \cdot (\overline{Y \vee Z}) \cdot \overline{C_{in}}$ |
| 01 | 1 | | 1 | 1 | 1 | | $+ (\overline{W \vee X}) \cdot (Y \vee Z) \cdot C_{in}$ |
| 10 | 1 | | 1 | 1 | 1 | | $+ (W \vee X) \cdot (\overline{Y \vee Z}) \cdot C_{in}$ |
| 11 | 1 | 1 | 1 | | | 1 | $+ \overline{C_{out}} \cdot (W + X) \cdot (Y + Z) \cdot \overline{C_{in}}$ | where $(W \vee X) = (\overline{W} + \overline{X}) \cdot (W + X)$ $(Y \vee Z) = (\overline{Y} + \overline{Z}) \cdot (Y + Z)$ Referring back to FIG. 5, the four operand inputs of the 4-2 CSA 616 of the "1" bit position receive the "1" weighted bits M11, M21, M31 and M41 of the four multiplicand multiples M1, M2, M3 and M4 from the multiplicand shift T/C gates 40 shown in FIG. 3. The 4-2 CSA 616 further receives a carry-in from the "½" weighted 4-2 CSA, not shown, and it generates two outputs, which are applied to the 4-bit adder 620, and a carry-out to the next higher-order or "2" bit position CSA 614. The other CSA's 610, 612 and 614 are similarly interconnected. The 4-bit adder 620 receives two outputs from each of the 4-2 CSA's 612, 614 and 616 one output (output A) from CSA 610 and one output (output B) from CSA of the "½" bit position. It also receives a carry in shifted form from the next higher order 4-bit adder, not shown after passing through a carry latch, not shown, similar to the carry latch 640. A carry from the 4-bit adder 620 is latched in the carry latch 640, the output of which is applied in shifted form to the next lower order 4-bit adder, not shown. Sums from the 4-bit adder 620 are applied to the sum latches 630, 632, 634 and 636, respectively, the outputs of which are applied to a carry propagate adder 650, the output of which, in turn, is applied to the register 670. The content of the register 670 representing a partial product of one iteration is applied to the carry propagage adder 650 in the next iteration after having been properly shifted, so that the previous partial product is added to the newly generated partial product.

According to the arrangement of FIG. 5, four pairs of outputs from adjacent 4-2 CSA's, together with a single carry fed back from an appropriate bit of the latched carry words, are combined in a 4-bit adder to produce four sum bits and a single carry-out. The outputs of the 4-bit adders are latched. The latched sum bits are dispatched to the carry propagate adder 650 while the latched carries from every fourth bit position are fed back in shifted form as input carries to the 4-bit adders. The significant changes made in the preferred embodiment of the present invention are that the 4-bit parallel adders 620 are provided, one for every 4-bit positions and that the carry propagate adder 650 is used to produce the sum of the current partial product and the previous partial products. By virtue of the above changes, the number of carry latches required is reduced from 4 to 1 per 4 bit positions and the number of I/O pins is substantially reduced because only one carry per 4 bit positions need be fed to another chip. In addition, since the sum bit and the carry bit need no longer be fed back for each bit position, the CSA tree is simplified from the 6-2 CSA tree to the 4-2 CSA tree. The 6-2 CSA tree comprising four 6-2 carry-save adders, as shown in FIG. 4, of a conventional design includes 92 gates and typically comprises a path of 6 gate levels, while the 4-2 CSA tree comprising four 4-2 carry save adders, as shown in FIG. 5, designed using the same groundrules, requires 56 gates with a typical path of 3 gate levels and the 4-bit parallel adder requires 32 gates and a typical path of 3 gate levels, totaling to 88 gates and 6 gate levels. It will thus be seen that, according to the preferred embodiment of the invention, the latch requirements and the I/O pin requirements are minimized without requiring more gates and without causing more delay. The latched sum outputs are dispatched only to the carry propagate adder and are so dispatched every iteration. Therefore, the propagate adder, which is normally idle, participates in reducing the multiple words during each iteration. The penalty is one extra cycle following the last iteration. This permits the latched carry word from the adder tree during the last iteration to flush through the adder tree by itself, so as to appear as a latched sum word entering the carry propagate adder.

Figure 8:
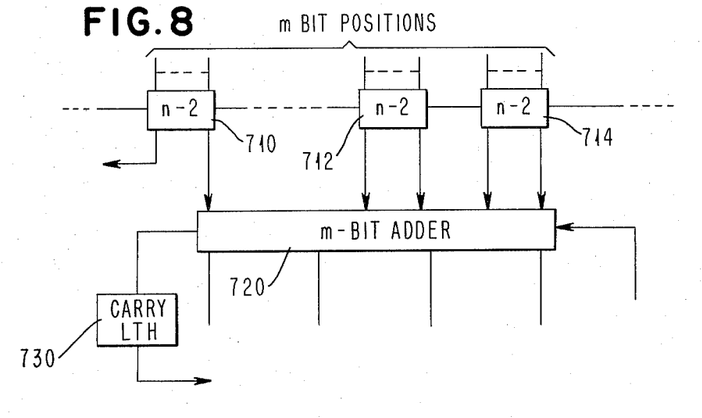
FIG. 8 shows a generalized form of an embodiment of the present invention.

While the 4-bit parallel adder and the 4-2 CSA tree are used in the embodiment of FIG. 5, any m-bit parallel adder and any n-2 CSA tree may be used. FIG. 7 shows a modification of the preferred embodiment of the present invention shown in FIG. 5. The arrangement of FIG. 7 uses an 8-bit adder 622 instead of the 4-bit adder 620 in FIG. 5. As a result, the arrangement of FIG. 7 needs only one carry latch for every 8 bit positions and can, therefore, save more carry latches and I/O pins than the arrangement of FIG. 5 can. However, the design of the 8-bit parallel adder would require more cost than what can be saved by the reduction of the number of carry latches. Accordingly, the selection of a particular number m for the m-bit parallel adder is a tradeoff between what is gained by saving the carry latches and what is lost by designing the multi-bit parallel adder. Similarly, a particular number n for the n-2 CSA's may be selected depending on a particular multiplier decoding scheme available, and cost and performance of the CSA tree. An m-bit slice of a more generalized arrangement of the present invention is shown in FIG. 8, in which numerals 710, 712, 714 designate n-2 CSA adders, numeral 720 designates an m-bit parallel adder and numeral 730 designates a carry latch.

In a certain circumstance, some of the input bits to a particular n-2 CSA are permanently zero. This may occur at the several right-end or left-end bit positions of the operand words to be added together because each operand is shifted by one or more bit positions relative to the adjacent operands. In such a case, the CSA for receiving those right-end or left-end bit positions need not be an n-2 CSA but it may be k-2 CSA where k≠n. Accordingly, the present invention needs not be limited to the embodiments shown in FIG. 5, 7 or 8 where a plurality of 4-2 or n-2 CSA's are used, but it covers any modification in which the CSA adder consists of a combination of n-2 CSA's and k-2 CSA's and/or i-2 CSA's, where k and i are different numbers from n.

While the invention has been particularly shown and described with references to preferred embodiments thereof, it will be understood by those skilled in the art that the foregoing and other changes in form and details may be made therein without departing from the spirit and scope of the invention.

Having thus described our invention, what we claim as new and desire to secure by Letters Patent is:

1. In a multiplier apparatus wherein p bits of a q-bit (p<q) multiplier word are examined in one iteration to produce r multiples of a multiplicand word, said multiples being added together to produce a partial product for the selected p-bit multiplier portion, said partial product, after having been properly shifted, being added to a partial product to be generated in the next iteration for the next higher-order p-bit multiplier portion to be selected in said next iteration to produce a sum of the newly generated partial product and the previously generated and properly shifted partial products such that after the final iteration of the multiplication a final product of the multiplicand word and the multiplier word is produced;

a carry-save/propagate adder apparatus for performing iterative addition of the partial products comprising;

an n-to-2 (n≧3) carry-save adder stage having a plurality of n-to-2 carry-save adders, one for each bit position of input operands, and receiving n plural-bit operands including the multiples of said multiplicand word generated in each iteration for reducing said n plural-bit operands to two other plural-bit operands representing a sum and a carry of said n plural-operands, at least one first m-bit parallel adder, m being no larger than the number of said n-to-2 carry save adders, one for each m bit positions of said operands, said first m-bit parallel adder receiving corresponding bits of said two other plural-bit operands for providing m output signals representing a sum of the input operands thereto, and a carry from the highest order position thereof, a second parallel adder receiving in each iteration said m output signals from said first m-bit parallel adder representing the sum of the input operands to said first m-bit parallel adder and generated in the current iteration, and m output signals generated in the previous iterations and representing high-order portions of the previous partial products; and means transmitting said carry from said first m-bit parallel adder to a lower order input of said first m-bit parallel adder.

2. A carry-save/propagate adder apparatus according to claim 1 wherein said n-to-2 carry-save adder stage is a 4-2 carry-save adder stage.

3. A carry-save/propagate adder apparatus according to claim 1 or 2 wherein said first m-bit parallel adder is a 4-bit parallel adder and a plurality of such 4-bit parallel adders are provided, one for every 4 bit positions.

4. A carry-save/propagate adder apparatus according to claim 1 or 2 wherein said first m-bit parallel adder is an 8-bit parallel adder and a plurality of such 8-bit parallel adders are provided, one for every 8 bit positions.

5. A carry-save/propagate adder apparatus according to claim 1, wherein said n-to-2 carry-save adder stage is a 4-2 carry-save adder stage, said first m-bit parallel adder is a 4-bit parallel adder, there being provided a plurality of such 4-bit parallel adders, and the carry from each of said 4-bit parallel adders is fed back to the lowest order input of the next lower-order 4-bit parallel adder.

6. A carry-save/propagate adder apparatus according to claim 1 further comprising;

a plurality of sum latches, one for each of the m output signals of said first m-bit parallel adder, for receiving and latching said m output signals, and at least one carry latch, one for each carry of said first m-bit parallel adder, for receiving and latching the carry from the highest order position of said first m-bit parallel adder, latched sums of said sum latches being applied to said second parallel adder while latched carry of said carry latch being fed back to the lower-order input of said first parallel adder by said transmitting means.

7. An adder apparatus for performing iterative addition of partial products for multiplication operation comprising;

a 4-2 carry-save adder stage having a plurality of 4-2 carry-save adders each having four operand inputs, a carry-in port, a sum output, a carry output and a carry-out port, each of said 4-2 carry-save adders receiving four bits from four operand words, one bit from each operand word, at said operand inputs, a carry-in from the next lower-order 4-2 carry-save adder at said carry-in port and producing a carry-out representing a carry from said four operand bits to be transmitted to the next higher-order 4-2 carry-save adder, and a sum and a carry at said sum output and said carry output representing a sum of said four operand bits and said carry-in, a plurality of 4-bit parallel adders, one for each 4 bit positions of the operand word, each receiving the sum outputs from the four 4-2 carry-save adders of the corresponding four bit positions and the carry outputs from the lower three orders of the four 4-2 carry-save adders of the corresponding four bit positions and from the next lower-order 4-2 carry-save adder, for providing four output signals representing a sum of said four sets of sum outputs and carry outputs, and a carry from the highest order position;

a plurality of sum latches, one for each output signal from each of said plurality of 4-bit parallel adders, for receiving and latching said output signals from said 4-bit parallel adders, a plurality of carry latches, one for each 4-bit parallel adder, for receiving and latching said carries from the highest order positions of said 4-bit parallel adders;

a plural-bit parallel adder receiving the latched sums from said sum latches for producing a partial product;

means for transmitting said carry from each of said 4-bit parallel adders to the lowest order position of the next lower-order 4-bit parallel adder; and means for shifting by eight bit positions the content of said plural-bit parallel adder representing the sum of previous partial products and feeding back a high-order portion of the shifted content to said plural-bit parallel adder for addition with the newly applied latched sums from said sum latches.

* * * * *